(12) United States Patent
Ramsdell et al.

(10) Patent No.: US 9,660,865 B2
(45) Date of Patent: May 23, 2017

(54) SYSTEM AND METHOD FOR INCREMENTAL IMPLEMENTATION OF NEW SERVICE CAPABILITIES (71) Applicant: TIME WARNER CABLE INC., New York, NY (US)

(72) Inventors: Scott W. Ramsdell, Charlotte, NC (US); Chris A. Cholas, Frederick, CO (US)

(73) Assignee: TIME WARNER CABLE INC., New York, NY (US)

( * ) Notice: Subject to any disclaimer, the term of this patent is extended or adjusted under 35 U.S.C. 154(b) by 286 days.

(21) Appl. No.: 14/033,585

(22) Filed: Sep. 23, 2013

(65) Prior Publication Data

US 2014/0025793 A1 Jan. 23, 2014

Related U.S. Application Data

(63) Continuation of application No. 12/032,036, filed on Feb. 15, 2008, now Pat. No. 8,566,895.

(51) Int. Cl.
*H04N 7/173* (2011.01)
*H04L 12/24* (2006.01)
(Continued)

(52) U.S. Cl.
CPC ........... *H04L 41/0813* (2013.01); *G06F 8/65* (2013.01); *G06F 11/3672* (2013.01);
(Continued)

(58) Field of Classification Search
USPC ....................................... 725/120
See application file for complete search history.

(56) References Cited

U.S. PATENT DOCUMENTS 5,608,446 A 3/1997 Carr et al.
6,839,829 B1 * 1/2005 Daruwalla et al. ............. 712/28
(Continued)

OTHER PUBLICATIONS

Robert McNabb et al. "HOST-MIB Tune-Up", CableLabs, Apr. 30, 2007, EC Identifier: HOST2.0-CFR-R-07.1038-1, pp. 1-54.
(Continued)

*Primary Examiner* — James R Sheleheda
*Assistant Examiner* — Charles N Hicks
(74) *Attorney, Agent, or Firm* — Volentine & Whitt, PLLC (57) ABSTRACT

A system for gradually implementing network services to end users includes substantially redundant first and second control networks, connectable to the end users through a routable communications network. The first control network provides a first service capability to all the end users. The second control network provides a second service capability to a first portion of the end users, the second service capability replacing the first service capability of the first portion of the end users. The second control network subsequently provides the second service capability to a second portion of the end users, while continuing to provide the second service capability to the first portion, the second service capability replacing the first service capability of the second portion of the end users. The second service capability provided to the second portion of the end users may include revisions based on feedback from the first portion of end users.

20 Claims, 3 Drawing Sheets

(51) Int. Cl.

| | |
|---|---|
| *H04N 21/24* | (2011.01) |
| *H04N 21/262* | (2011.01) |
| *H04N 21/472* | (2011.01) |
| *H04N 21/475* | (2011.01) |
| *H04N 21/6405* | (2011.01) |
| *H04N 21/845* | (2011.01) |
| *G06F 9/445* | (2006.01) |
| *G06F 11/36* | (2006.01) |
| *H04L 29/08* | (2006.01) |

(52) U.S. Cl.
CPC .......... *H04L 41/12* (2013.01); *H04L 41/5054* (2013.01); *H04L 67/34* (2013.01); *H04N 21/2408* (2013.01); *H04N 21/26291* (2013.01); *H04N 21/475* (2013.01); *H04N 21/47202* (2013.01); *H04N 21/6405* (2013.01); *H04N 21/8453* (2013.01)

(56) References Cited

U.S. PATENT DOCUMENTS

| | | | |
|---|---|---|---|
| 7,802,286 | B2 | 9/2010 | Brooks et al. |
| 7,869,369 | B2 | 1/2011 | Overcash |
| 2002/0194594 | A1* | 12/2002 | Poli ................................ 725/34 |
| 2003/0056217 | A1 | 3/2003 | Brooks |
| 2007/0086349 | A1 | 4/2007 | Liu |
| 2007/0217436 | A1 | 9/2007 | Markley et al. |
| 2008/0098212 | A1 | 4/2008 | Helms et al. |
| 2009/0187939 | A1 | 7/2009 | Lajoie |

OTHER PUBLICATIONS

"CableCARD™ Interface 2.0 Specification-OC-SP-CCIF2.0-I10-070323", CableLabs, Mar. 23, 2007, pp. 1-317.

"OpenCable Host Device 2.0 Core Functional Requirements-OC-SP-HOST2.0-CFR-I13-070323", CableLabs, Mar. 23, 2007, pp. 1-140.

* cited by examiner

SYSTEM AND METHOD FOR INCREMENTAL IMPLEMENTATION OF NEW SERVICE CAPABILITIES

The present application is a continuation application under 37 C.F.R. §1.53(b) of commonly owned U.S. patent application Ser. No. 12/032,036 to Scott W. Ramsdell et al., entitled "System and Method for Incremental Implementation of New Server Capabilities," filed on Feb. 15, 2008. Priority is claimed under 35 U.S.C. §120 from U.S. patent application Ser. No. 12/032,036, the entire contents of which is hereby incorporated by reference.

BACKGROUND

In response to significant demand, digital entertainment services are being developed, implemented and updated at an increasingly rapid rate. Traditionally, new services and improvements to existing services are tested in labs before being "rolled out" to the general consumer population (i.e., pay television subscribers). Typically, the testing relies on a small group of selected users, who may be screened in an effort to represent various segments of the general population.

The testing is performed under controlled conditions in the lab setting. The testing may include, for example, determining the overall desirability of a product or service (such as movies on demand or television on demand), as well as determining the ease with which the representative customers can obtain and use the product or service. For example, lab testing may reveal a high degree of interest in a new video service, but the user interface, e.g., an application or firmware running on a set top box (STB), may prove to be exceedingly complicated or time consuming.

Despite efforts to make such testing as realistic as possible, laboratory testing has limited success due, in part, to the artificial environment and the relatively narrow exposure to the public through the limited size and characteristics of the test group. It would therefore be desirable to test new services on a large number consumers under actual conditions to collect feedback, e.g., by providing the new services in customer homes for use over several weeks.

However, testing new services on the consumer population at large is risky, since they must be implemented on a large scale somewhat prematurely. In the event the new service turns out to be generally undesirable, or in need of small changes in implementation, the entire system must be re-provisioned, at the significant expense and effort of the provider. In addition, the provider risks alienating its customers, who are exposed to what turns out to be a sub-par service. Many of these customers may change providers as a result, or even if they stay with the same provider, they may elect not to subscribe to the undesirable service, even after improvements subsequently are made based on initial feedback.

Therefore, a method and system that enables gradual rollout of new services over incrementally large portions of the consumer population is desirable. Feedback from actual end users may then be collected, and changes may be implemented, before too many customers are potentially affected.

SUMMARY

In a representative embodiment, a method provides for incrementally implementing network service capabilities to multiple end users through a first control network and a second control network, which is substantially redundant to the first control network. The method includes providing a first service capability to the end users through the first control network, and providing a second service capability to a first testing portion of the end users through the second control network, the second service capability replacing the first service capability of the first testing portion of the end users. The second service capability is subsequently provided to a second testing portion of the end users, in addition to the first testing portion, through the second control network. The second service capability replaces the first service capability of the second testing portion of the end users.

A sum of the first testing portion and the second testing portion of the end users may substantially equal all the end users. Also, a third service capability may be subsequently provided to the first testing portion of the end users through the first control network, the third service capability replacing the second service capability of the first testing portion of the end users.

The method may further include receiving feedback from the first testing portion of the end users regarding at least one of a quality and desirability of the second service capability before subsequently providing the second service capability to the second testing portion of the end users. The second service capability may be revised based on the feedback received from the first testing portion of the end users before subsequently providing the second service capability to the second testing portion of the end users. At least one of the first testing portion and the second testing portion of the end users may be returned to the first service capability, provided through the first control network.

The first service capability may include service application software, and the second service capability may include a newer version of the service application software. For example, the first service capability may include movies on demand, premiums on demand or pay per view service application software, and the second service capability may include a newer version of the movies on demand, the premiums on demand, or the pay per view service application software. The first service capability may include bootloader firmware, and the second service capability may include a newer version of the bootloader firmware.

The first testing portion of the end users may include a first service group of multiple service groups, and the second testing portion of the end users may include a second service group the multiple service groups. The first service group may be serviced by a first hub and the second service group may be serviced by a second hub, the first and second hubs being accessible to both the first control network and the second control network.

In another representative embodiment, a system for gradually implementing network services to multiple end users includes a first control network and a second control network. The first control network is connectable to the multiple end users through a routable communications network, the first control network providing a first service capability to the end users. The second control network, which is substantially redundant to the first control network, is also connectable to the end users through the routable communications network. The second control network provides a second service capability to a first portion of the end users, the second service capability replacing the first service capability of the first portion of the end users. The first control network continues to provide the first service capability to a second portion of the end users, separate from the first portion of the end users.

The second control network may subsequently provide the second service capability to the second portion of the end users, while continuing to provide the second service capability to the first portion. The second service capability replaces the first service capability of the second portion of the end users.

The second service capability provided to the second portion of the end users may be a subsequent version of the second service capability. The subsequent version may include at least one revision based on feedback from the first portion regarding the second service capability. The second control network may subsequently provide the second service capability to all end users. The first control network may subsequently provide a third service capability to the first portion of the end users.

The first control network may include a first service complex, having at least one of first application software and first bootloader firmware associated with the first service capability, and a first digital network control system (DNCS) controller. The second control network may include a second service complex, having at least one of second application software and second bootloader firmware associated with the second service capability, and a second DNCS controller. The first and second DNCS controllers may be selectively connectable to the users through the routable communications network and multiple hubs corresponding to multiple service groups. The first portion of the end users may be accessible through a first hub of the multiple hubs, and the second portion of the end users may be accessible through a second hub of the multiple hubs.

The routable communications network may include a first application carousal and a first bootloader carousal for respectively broadcasting information corresponding to the first service capability to the first portion of the end users. Further, the routable communications network may include a second application carousal and a second bootloader carousal for respectively broadcasting information corresponding to the second service capability to the second portion of the end users.

In another representative embodiment, a method provides incrementally implementing media services to multiple customers through a first control network and a second control network, which is substantially redundant to the first control network. The method includes providing a first service capability to the customers through the first control network and providing a second service capability to a first test group of the customers through the second control network, where the second service capability replaces the first service capability of the first test group. Feedback is received from the first test group regarding the second service capability. The second service capability is revised in response to the received feedback, and the revised second service capability is provided to a second test group of the customers through the second control network. The second test group includes at least the first test group.

Feedback may be received from the second test group regarding the revised second service capability. The revised second service capability may then be revised in response to the received feedback to obtain a final service capability. The final service capability may be provided to the customers through the second control network, and the first service capability may be discontinued.

BRIEF DESCRIPTION OF THE DRAWINGS

The present teachings are best understood from the following detailed description when read with the accompanying drawing figures. The features are not necessarily drawn to scale. Wherever practical, like reference numerals refer to like features.

DETAILED DESCRIPTION

In the following detailed description, for purposes of explanation and not limitation, representative embodiments disclosing specific details are set forth in order to provide a thorough understanding of the present teachings. Descriptions of well-known devices, hardware, software, firmware, methods and systems may be omitted so as to avoid obscuring the description of the example embodiments. Nonetheless, such hardware, software, firmware, devices, methods and systems that are within the purview of one of ordinary skill in the art may be used in accordance with the representative embodiments.

Figure 1:
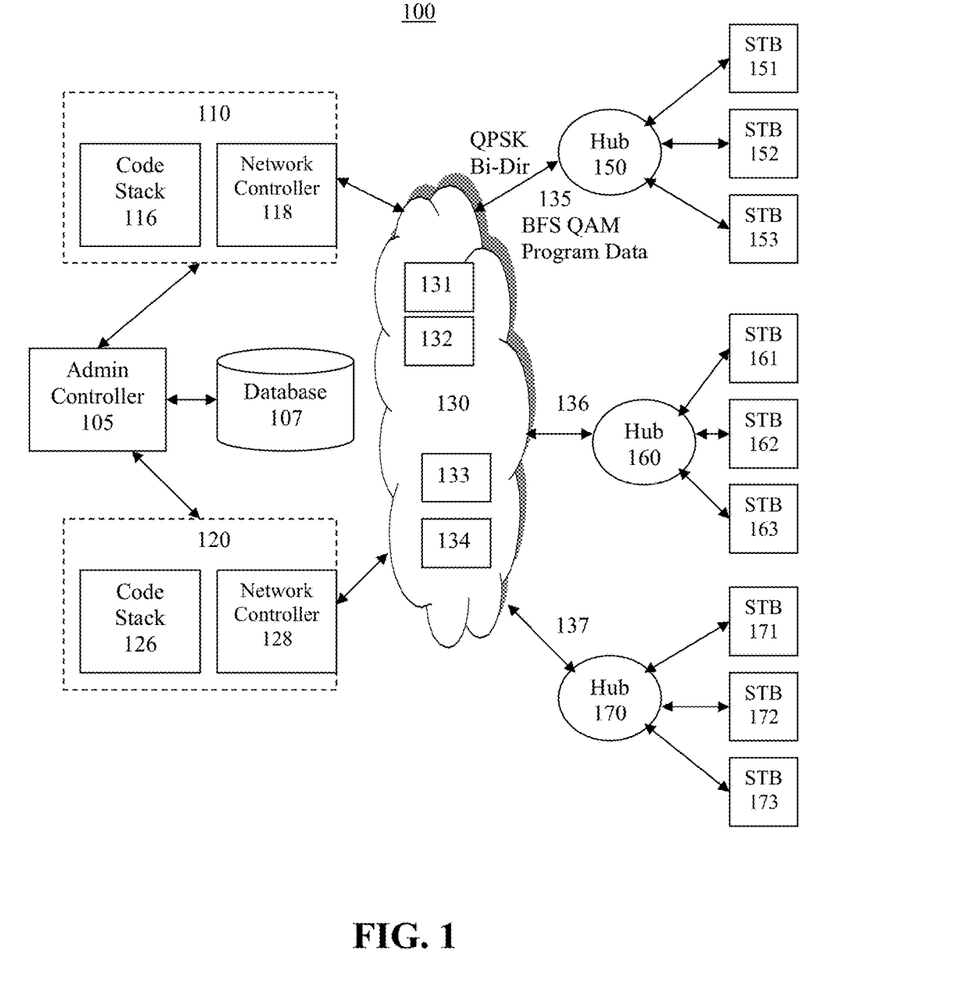
FIG. 1 is a block diagram illustrating a system for gradual roll out of network services according to a representative embodiment of the present invention.

FIG. 1 is a block diagram illustrating a system for incremental roll out of network service capabilities, according to a representative embodiment of the present invention. The network service capabilities include, for example, application server software for providing actual network services, such as video on demand, movies on demand, pay per view, digital video recorder (DVR), etc., as well as end-user or customer equipment software for operating the end-user equipment (e.g., STBs 151-153, STBs 161-163, STBs 171-173) and for enabling access to the various network services, such as client applications, bootloader firmware, and the like.

The system 100, which may be a cable head-end, for example, includes substantially redundant control networks 110 and 120, by which various services are provided to multiple end users or customers. For purposes of explanation, the system 100 may be a digital broadband delivery system (DBDS) of a cable television operator, for example, configured to support any number and type of interactive television services over a cable network (e.g., routable network 130). The system 100 may be configured to receive signals having multimedia content from various sources (not shown), e.g., over cable, fiber, satellite networks or the like. The system 100 may be regional, situated to provide signaling downstream to multiple customers within a particular geographic region over a communications network, such as network 130. Additionally, the system 100 may also be, for example, a fiber-to-the home delivery system, a satellite delivery system or any other known delivery system.

The control networks 110 and 120 include substantially the same features and functionalities, and are configured with the capability of performing essentially redundant operations. In other words, each control network 110, 120 implements the same services as the other, although not necessarily at the same time. The control networks 110, 120 respectively include code stacks 116, 126 and network controllers 118, 128.

The code stacks 116, 126 are each associated with service complexes for implementing different services, such as video on demand, movies on demand, pay per view, digital video recorder (DVR), and the like. Each service offered by the service provider has an associated application. Thus, each of the code stacks 116, 126 may include separate application servers (not shown) corresponding to the different applications. Alternatively, the code stacks 116, 126 may share the application severs of the various service complexes, which may be networked and accessible to the code stacks 116, 126 by switches.

The code stacks 116, 126 likewise include client applications, middleware, firmware and the like, for the end users' equipment (e.g., STBs 151-153, STBs 161-163, STBs 171-173), which may be implemented and/or revised independently of the different network services. For example, the bootloader for STBs 151-153 is implemented by firmware downloaded by the STBs 151-153 through the network 130, as discussed below. The end users' equipment of each hub or service group may include the same bootload image. For example, STBs 151-153 may include the same bootload image, which may differ from the bootload image of STBs 161-163 and/or STBs 171-173.

The bootloader or other firmware is stored at the code stack 116 and/or 126, and may be updated periodically, regardless of whether any network service is being updated. Alternatively, a new release of a network service may require changes to the bootloader firmware on at least some of the end users' equipment (e.g., STBS 151-153). Accordingly, the revisions to application and corresponding bootloader software are available at the code stack 116 and/or 126.

The network controllers 118, 128 of the control networks 110 and 120 may include UNIX servers, for example. In an embodiment, the network controllers may be implemented as Digital Network Control System (DNCS) controllers, available from Scientific Atlanta. The network controllers 118, 128 interface with and control configuration of the end users' equipment (e.g., STBs 151-153, STBs 161-163, STBs 171-173), through the routable control network 130 and various hubs, such as hubs 150, 160 and 170. The network controllers 118, 128 may access a database, such as customer database 107, which stores account information regarding the various customers. The account information may include, for example, the type of customer premises equipment (e.g., make and model of STBs 151-153, STBs 161-163, STBs 171-173), version of firmware currently running on the customer premises equipment, customer location, corresponding service group, network services to which each customer subscribes, the version of the network service currently implemented on behalf of the customer, billing information, and the like.

The control network 130 may be Transmission Control Protocol (TCP)/IP packet switching network, for example. In various embodiments, the network 130 may be physically implemented over a hybrid fiber coaxial (HFC) network, although other data communication networks such as fiber to the home, may be implemented without departing from the spirit and scope of the present invention. Each of the connections 135, 136 and 137 between the network 130 and the hubs 150, 160, 170 may include a downstream quadrature amplitude modulation (QAM) channel for sending program data to the STBs, as well as an independent bi-directional quadrature phase shift keying (QPSK) channel for exchanging control information between the network 118, 128 the STBs. The QAM channel provides in-band communications, while the QPSK channel provides out-of-band communications.

Representative end users' equipment includes numerous STBs, represented in FIG. 1 by exemplary STBs 151-153 corresponding to hub 150, STBs 161-163 corresponding to hub 160, and STBs 171-173 corresponding to hub 170. In an embodiment, the hubs 150, 160, 170 are equivalent to service groups, although a single hub may alternatively include multiple service groups. It is understood that the depicted number of hubs and STBs is for discussion purposes only, and that the network controllers 118, 128 may be configured to handle thousands of STBs. Each of the DNCS controllers 118, 128 is able to communicate with all hubs (e.g., hubs 150, 160, 170) and all customers (e.g., STBs 151-153, 161-163, 171-173), via the network 130, so that there may be complete redundancy.

The network controllers 118, 128 may also be configured to control data broadcasting, routine maintenance and registering of various applications. For example, the network controller 118, 128 may include a broadcast file system (BFS), which includes data relating to the end users, such as STB configurations including firmware and client applications. The data is available through a "carousel" file system, which is broadcast continuously, so that the STBs are able to selectively access files at high speeds. The carousels include, for example, representative application carousels 131, 133 and representative bootloader carousels 132, 134, which are separately addressable carousels in the network 130. It is understood that the network 130 may include numerous additional application and/or bootloader carousels, depending on various factors, such as the number of network services available, the number of end-users, the number and size of service groups, the different types of STBs in the service groups, and the like. Further, the number of application and/or bootloader carousels may be adjusted to provide unique benefits for any particular situation or to meet various design requirements.

Each of the application carousels 131, 133 includes a repeating stream of audio, video and/or data which is broadcast. The network controllers 118, 128 (and/or the administration controller 105) controls the content insertion and deletion from the carousels 131, 133. The network controllers 118, 128 are thus able to separately load new and updated applications on the STBs 151-153, 161-163, 171-173, for example, via the carousel 131 and/or 133. Likewise, each of the bootloader carousels 132, 134 includes a repeating stream of data for providing STB firmware, for example, which data is broadcast. The network controllers 118, 128 (and/or the administration controller 105) control the content insertion and deletion from the carousels 132, 134, as well. The network controllers 118, 128 are thus able to separately load new and updated firmware on the STBs 151-153, 161-163, 171-173, for example, via the carousel 132 an/or 134.

Significantly, because the network controllers 118, 128 are able to separately control content insertion and deletion from the application carousals 131, 133 and the bootloader carousals 132, 134, each of the application carousals 131, 133 and the bootloader carousals 132, 134, may have different content at any one time. For example, network controller 118 may control application carousal 131 and bootloader carousal 132, while network controller 128 may control application carousal 133 and bootloader carousal 134. Accordingly, the STBs 151-153, 161-163, 171-173 may retrieve different information, through respectively corresponding hubs 150, 160, 170, such as new or updated applications/firmware from different carousals, depending on the contents of the respectively assigned carousals.

For example, all of the STBs connected to hub 150 (e.g. STBs 151-153) may access application carousal 131 and bootloader carousal 132, while all of the STBs connected to hub 160 (e.g. STBs 161-163) may access application carousal 133 and bootloader carousal 134. Thus, the network controllers 118, 128 are able to provide different firmware and access to different applications to different sets of hubs and corresponding STBs at the same time. In comparison, conventional systems have one network controller serving an entire footprint of STBs, and one application carousal and one bootloader carousal corresponding to that foot print. In other words, all of the STBs retrieve the same application and bootloader information.

Accordingly, as discussed below, new or updated service capabilities may be distributed to limited portions of the actual end user population, e.g., for testing the service capabilities to determine their utility, viability and/or desirability. For example, STBs 151-153 may be provided an updated service capability (e.g., updated firmware) through corresponding hub 150. Feedback from the corresponding end users enables the service provider to analyze the updated service capability under actual conditions and to determine the usefulness of the updated service capability. For example, as a result of the analysis, the service provider may decide to implement the updated service capability among the remaining end users (e.g., STBs 161-163, 171-173), to make additional revisions to the service capability, or to cancel or abandon the updated service capability. Significantly, when the updated service capability is canceled, the system 100 enables the testing portion of end users (e.g., STBs 151-153) to be easily switched back to the original service capability by simply reassigning the hub 150 to the original carousal(s) and/or by inserting the original service capability information into the current carousal(s).

Figure 2:
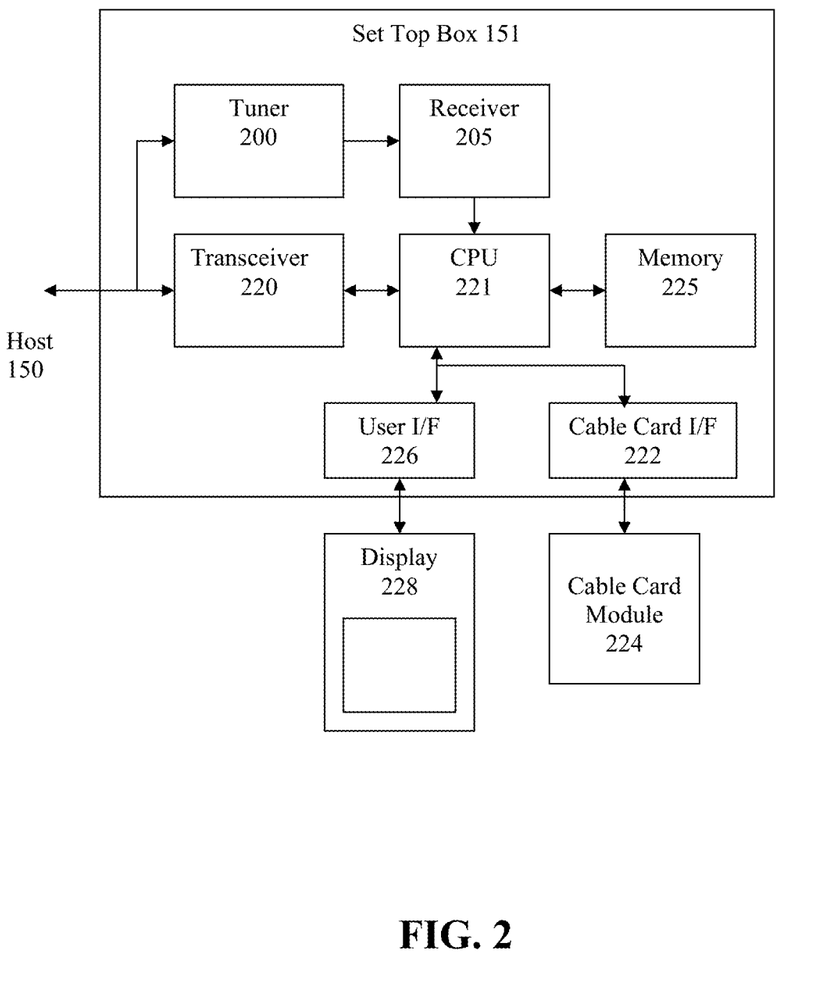
FIG. 2 is a block diagram illustrating customer premises equipment according to a representative embodiment of the present invention.

FIG. 2 is a block diagram of an illustrative STB (e.g., STB 151), according to an embodiment. It is understood that the term STB is to be interpreted broadly to include any customer premises processing functionality, and may be a separate "box," or integrated into a television or other equipment. Thus, STBs 151-153, 161-163, 171-173, are merely examples of customer premises equipment capable of communicating with the system 100. Other examples may include digital ready televisions, digital video disk (DVD) players, digital video recorders (DVR), or the like. The customer premises equipment may be addressable on the network 130, and capable of bi-directional communications with the control networks 110, 120. In an embodiment, the customer premises equipment, such as STBs 151-153, 161-163, 171-173, may be implemented in accordance with OpenCable™ Host Device 2.0 Core Functional Requirements, OC-SP-HOST2.0-CFR-113-070323, and OpenCable™ Host Device 2.0 Core Functional Requirements, Engineering Change Request (ECR) 1038, HOST2.0-CFR-R-07.1038-1, the contents of each of which are incorporated herein by reference.

Referring to FIG. 2, representative STB 151 includes a tuner 200, which may be tuned to various broadcast channels to receive data signals, e.g., from the network controllers 118, 128, application carousals 131, 133, and/or bootloader carousals 132, 134, via the hub 150. For example, the tuner 200 may receive radio frequency (RF) signals via the hub 150 and deliver the RF signals to a QAM receiver 205, which decodes the received in-band signals. The STB 151 also includes a QPSK transceiver 220, which receives and decodes received out-of-band signals, and modulates and transmits out-of-band signals to be sent, for example, to the network controllers 118, 128.

A central processing unit (CPU) or processor 221 runs client applications and/or firmware, which may be stored in memory 225, and processes the received data signals in accordance with the client applications. Alternatively, the processor 221 may include its own memory (e.g., nonvolatile memory) for storing executable software code that allows it to perform the various functions of STB 151. The memory 225 may include an electrically erasable programmable read-only memory (EEPROM), such as a flash memory, for example, used to store client software corresponding to service applications and/or firmware (e.g., operating system, control programs and bootloader code) for operating the STB 151.

The bootloader of the STB 151, in particular, may be implemented in firmware (or software) that is stored in the memory 225 and executed by the processor 221. The bootloader manages the downloading of a new or updated operating system and/or control programs to the STB 151, as well as performs check-up and recovery procedures. For example, the bootloader firmware may download upgraded operating system software and control programs through the network controllers 118, 128, to accommodate new services or modifications to existing services. More particularly, the bootloader enables the STB 151 to tune to a frequency of a broadcast carousel in the network 130, such as bootloader carousals 132, 134f, and identify operating system software upgrades, for example. When an upgrade is available, the bootloader downloads the new software from the network 130 into the memory 225. Also, the bootloader may be configured to replace a malfunctioning operating system of the STB 151 with a replacement operating system.

The STB 151 may include an interface 222 to a cablecard module 224, e.g., conforming to the CableCARD™ standard, for providing a conditional access function. For example, the cablecard module 224 may include decryption functionality for decrypting digital content received from the network controllers 118, 128 and user authentication functionality to authenticate the customer, when necessary. The cablecard module 224 may be an internal module or a separate card. When the cablecard module 224 is a separate card, the interface 222 may be a standard Personal Computer Memory Card International Association (PCMCIA) interface, as identified in the OpenCable™ standard.

Representative STB 151 also includes a user interface 226 for interfacing with a display 228, as well as user input devices (not shown), such as a remote control device and/or a keyboard or function keys. Digital content may be displayed to the customer at the display 228 through the user interface 226. Also, configuration and performance information may be viewed at the display 228 through the user interface 226, as needed. Likewise, various commands, instructions and other input, including channel and programming selection, authentication data and the like, may be sent and received by the STB 151, for example, through the user interface 226. Such commands and instructions may be processed by the processor 221, which may also perform various programming and signal processing functions.

In various embodiments of the invention, feedback regarding received services may be electronically provided by the end user through the user interface 226. For example, when a user receives a newly rolled out service or a revision of an existing service (e.g. via STB 151), as discussed herein, the user may provide information relating to the quality and desirability of the service, the extent to which the service is user friendly, the extent to which the user actually utilizes the service, the number and ages of people who most often utilize the service, etc. The information may be provided by the user in a narrative fashion, or the user may be asked to periodically respond to specific questionnaires, which may be provided through the STB 151 by the network controllers 118, 128, for example. In alternative embodiments, the user may respond to questions regarding new and revised services through separate media, including telephone, email, text messaging, mail, and the like. The information is analyzed by the service provider to assist in making determinations regarding whether to continue providing a particular service and expanding the customer area, or to cancel or further revise the same.

Figure 3:
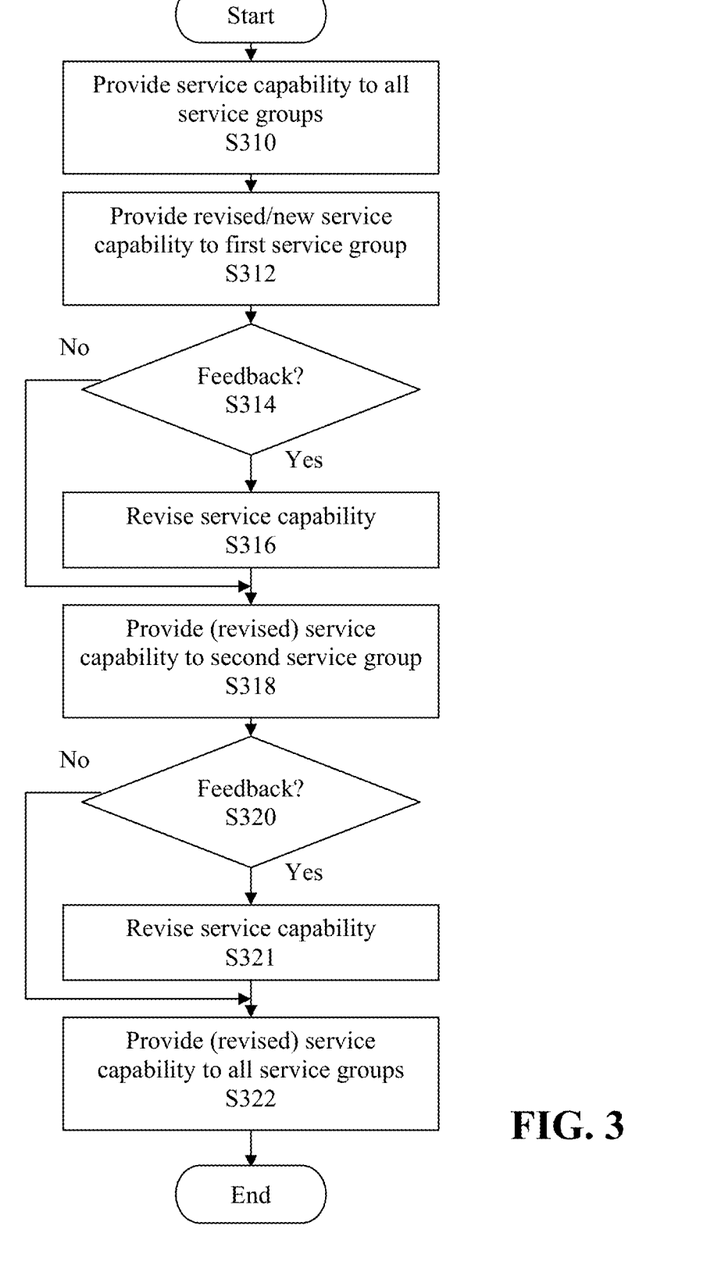
FIG. 3 is a flowchart illustrating a method for gradual roll out of network services according to a representative embodiment of the present invention.

FIG. 3 is a flowchart illustrating a method for incrementally rolling out network service capabilities according to a representative embodiment of the present invention. At step S310, a network service capability is provided to the service provider's customers. The network service capability may have been previously vetted according to the process described herein. Regardless, for purposes of discussion, all service groups and corresponding end-users (e.g., STBs 151-153, 161-163, 171-173) are assumed be initially configured with the same service capability (e.g., the same version of a particular network service application and/or STB firmware) at the beginning of the process. It is understood that service groups and corresponding end-users may have different versions of the various service capabilities throughout the process. For example, as stated above, the STBs in different service groups may have different bootload images, which in turn may require slightly different versions of service applications.

The network service capability may be implemented by either of the redundant control networks 110 or 120. For purpose of explanation, it is assumed that the control network 110 provides the initial service to all of the end-users. The service capability may include application data and/or bootloader information, which may be received by the end-users (e.g., STBs 151-153, 161-163, 171-173) through an application carousal (e.g., application carousal 131) and/ or a bootloader carousal (e.g., bootloader carousal 132), respectively, in the network 130.

At step S312, a revised or new service capability is provided to a portion of the end-users, referred to as the first service group. In an embodiment, and for purposes of simplifying explanation, a service group consists of the end-users (e.g., STBs) connected to a single hub, although it is understood that a service group is not limited to this configuration. For example, a hub may include multiple service groups, in alternative embodiments. The revised (or new) service capability is programmed at the service complex of the control network implementing the new service. For example, assuming that the revised service is implemented under the control of the control network 120, the revised service capability is provisioned in the code stack 126 for distribution by the network controller 128.

For example, referring to FIG. 1, it is assumed for purposes of explanation that the first service group corresponds to hub 150. Therefore, STBs 151-153 begin receiving the first revised (or new) service capability at step S312. For example, STBs 151-153 may download revised application software broadcast from their assigned carousal (e.g., application carousal 133), under the control of the network controller 128 of control network 120. Meanwhile, the control network 110 continues to provide the initial service capability to the other service groups (e.g., hubs 160, 170), which continue to receive the original application software from their assigned carousal (e.g., application carousal 131), under the control of the network controller 118 of control network 110.

Of course, the revised service capability may include a revised version of bootloader firmware, downloaded by STBs 151-153 from the bootloader carousal 134, for example, in the same manner. It is understood that revised (or new) versions of application software do not necessarily require corresponding revised (or new) versions of bootloader firmware. Likewise, revised (or new) versions of bootloader firmware do not necessarily require corresponding revised (or new) versions of application software. Therefore, revisions to network service capabilities are intended to cover revisions to either or both application software and/or bootloader firmware. It is further understood that the STBs of the various service groups (e.g., hubs 150, 160, 170) have different bootloader images, so the revised (or new) versions of application software may be slightly different to accommodate the differences in bootloader firmware. However, for purposes of discussion, when the general features utilized by the customers are substantially the same, the application software is considered to be the same version.

The end-users receiving the first revised (or new) service capability are asked to provide feedback regarding the service capability, which is received at step S314. As stated above, the feedback may be received, e.g., by the network controller 128 of the control network 120 and/or the administration controller 105, through user input at the STBs 151-153, although feedback may be collected in any manner, including telephone, email, text messaging, regular mail, and the like. When feedback is received (step S314: Yes), the information is analyzed by the service provider to assist in making determinations regarding whether to continue providing the service capability (or the current version of the service capability) and expanding the customer area, or to cancel or further revise the same. In the example depicted in FIG. 3, the service is revised a second time in accordance with the feedback at step S316.

After revisions to a service capability have been made (step S316), the second revised service is provided to a larger segment of the customer population. Alternatively, when no feedback is received (step S314: No), or when the feedback is positive overall, the first revised service capability may be provided to a larger segment of the customer population. However, for purposes of explanation, it is assumed that revisions have been made and that the second revised service capability is being provided to more customers. In an embodiment, the second revised service capability may be implemented by the control network 120, e.g., provisioned in the code stack 126 and distributed and controlled by the network controller 128.

At step S318, the second revised service capability is provided to a second service group, which for purposes of explanation, corresponds to the hub 160 of FIG. 1 (e.g., STBs 161-163). More particularly, the hub 160 is reassigned to the control network 120, so that STBs 161-163 begin downloading application software and/or firmware broadcast from the corresponding carousals (e.g., application carousal 133 and bootloader carousal 134, respectively), under the control of the control network 120. In an embodiment, the second revised service capability is also provided to the first service group (e.g., corresponding to the hub 150), which continues to operate under the control of control network 120, so that a larger end-user population now receives the second revised service capability. Meanwhile, the control network 110 continues to provide the initial service capability to the remaining service groups (e.g., hub 170), which continues to receive the original application software and/or firmware from its assigned carousal (e.g., application carousal 131 and bootloader carousal 132, respectively), under the control of the control network 110.

Alternatively, the second revised service capability may be implemented by the control network 110, and the second service group (e.g., corresponding to hub 160) may begin receiving the second revised service capability information (e.g., from application and bootloader carousals 131 and 132) under the continued control of the control network 110, while the first service group continues to receive the first revised service capability under the control of the control network 120. Or, both the first and second service groups (e.g., corresponding to hubs 150, 160) may be instructed to receive the second revised service capability information from the control network 110 (e.g., through application and bootloader carousals 131 and 132), while the control network 120 takes over providing the first revised service capability (or the original service capability) to the remaining service groups (e.g., corresponding to hub 170).

At step S320, it is determined whether feedback is received from first and/or second service groups regarding the second revised service capability. When no feedback is received, or when only positive feedback is received (step S320: No), it may be determined that the second revised service capability be provided to the entire end-user population at step S322. For example, the second revised service capability may be expanded to include any remaining service groups (e.g., corresponding to hub 170), as well as the service groups to which the second revised service capability is already being provided.

When there is additional feedback regarding the second revised service capability (step S320: Yes), the service capability may be revised again at step S321, for example. It may then be determined that the third revised service capability be provided to the entire end-user population at step S322. For example, the third revised service capability may be provided to all remaining service groups (e.g., corresponding to hub 170), as well as the service groups to which the second revised service capability is provided. In an embodiment, the third revised service capability may be provided by the control network 120, which frees the control network 110 to repeat the process to test and implement another new or revised service capability, beginning with one of the service groups.

It is understood that the disclosed embodiments are not limited to a particular number of revisions and/or distributions to service groups. In other words, although FIG. 3 shows an initial service capability being potentially revised three times, and distributed first to one service group (e.g., hub 150) for first feedback at step S312 and two service groups (e.g., hubs 150, 160) for second feedback at step S318, more or fewer revisions and subsequent distributions may be made before providing the service capability to all service groups. For example, following step S321, the third revised service capability may be provided to three service groups (e.g., hubs 150, 160, 170) for another round of feedback.

It is further understood that the disclosed embodiments are not limited to a particular number of redundant control networks. In other words, although FIG. 1 shows two redundant control networks 110, 120, the system may be configured to include three redundant control networks, for example, one of which continuously provides the original service to a decreasing number of service groups. The other two control networks may then alternate between providing newer revisions to an increasing number of service groups, until it is determined that the service is ready for distribution to all service groups.

Although the present teachings have been described in detail with reference to particular embodiments, persons possessing ordinary skill in the art to which the present teachings pertain will appreciate that various modifications and enhancements may be made without departing from the spirit and scope of the claims that follow. Also, the various devices and methods described herein are included by way of example only and not in any limiting sense.

What is claimed:

1. A method for gradually implementing network service capabilities to a plurality of end users through a first control network and a second control network, each of the first and second control networks being connectable to the plurality of end users via a communications network, the method comprising:
providing a first service capability to the plurality of end users through the first control network;
subsequently providing a second service capability to a first testing portion of the plurality of end users through the second control network, the second service capability replacing the first service capability of the first testing portion of the plurality of end users; and
subsequently providing the second service capability to a second testing portion of the plurality of end users, in addition to the first testing portion, through the second control network, while continuing to provide the first service capability to remaining end users of the plurality of end users through the first control network, the second service capability replacing the first service capability of the second testing portion of the plurality of end users.

2. The method of claim 1, further comprising:
subsequently providing the second service capability to a third testing portion of the plurality of end users, in addition to the first and second testing portions, through the second control network, the second service capability replacing the first service capability of the third testing portion of the plurality of end users.

3. The method of claim 1, further comprising:
receiving feedback from the first testing portion of the plurality of end users regarding at least one of a quality and desirability of the second service capability before subsequently providing the second service capability to the second testing portion of the plurality of end users.

4. The method of claim 3, further comprising:
revising the second service capability based on the feedback received from the first testing portion of the plurality of end users before subsequently providing the second service capability to the second testing portion of the plurality of end users.

5. The method of claim 3, wherein the first service capability comprises service application software, and the second service capability comprises a newer version of the service application software.

6. The method of claim 5, wherein the first service capability comprises one of movies on demand, premiums on demand or pay per view service application software, and the second service capability comprises a newer version of the movies on demand, the premiums on demand, or the pay per view service application software.

7. The method of claim 3, wherein the first service capability comprises bootloader firmware, and the second service capability comprises a newer version of the bootloader firmware.

8. The method of claim 1, wherein the first testing portion of the plurality of end users comprises a first service group of a plurality of service groups, and the second testing portion of the plurality of end users comprises a second service group of the plurality of service groups, and
wherein the first service group is serviced by a first hub and the second service group is serviced by a second hub, the first and second hubs being accessible to both the first control network and the second control network.

9. The method of claim 1, further comprising:
returning at least one of the first testing portion and the second testing portion of the plurality of end users to the first service capability, provided through the first control network.

10. The method of claim 1, further comprising:
receiving signals having multimedia content for the first service capability and the second service capability via a one of a cable network, a fiber network and a satellite network.

11. A system for gradually implementing network services to a plurality of end users, the system comprising:
a first control network configured to interface with customer premises equipment of each of the plurality of end users through a communications network, the first control network providing a first service capability to the plurality of end users; and
a second control network configured to interface with the customer premises equipment of each of the plurality of end users through the communications network, the second control network providing a second service capability to incrementally increasing portions of the plurality of end users over time, the second service capability replacing the first service capability of each incrementally increasing portion of the plurality of end users;
wherein the first control network continues to provide the first service capability to incrementally decreasing portions of the plurality of end users, as the second control network provides the second service capability to the incrementally increasing portions of the plurality of end users.

12. The system of claim 11, wherein the communications network comprises a Transmission Control Protocol (TCP)/IP packet switching network.

13. The system of claim 11, wherein the communications network is physically implemented over a hybrid fiber coaxial (HFC) network.

14. The system of claim 11, wherein the system is a fiber-to-the home delivery system.

15. The system of claim 11, wherein the system is a satellite delivery system.

16. The system of claim 11, wherein the first control network comprises a first code stack including an application server corresponding to each service provided by the first service capability, and a first digital network control system (DNCS) controller selectively connectable to the plurality of users through the communications network, and wherein the second control network comprises a second code stack including an application server corresponding to each service provided by the second service capability, and a second DNCS controller selectively connectable to the plurality of users through the communications network.

17. The system of claim 11, wherein each of the customer premises equipment is addressable on the communications network, and is capable of bi-directional communications with both of the first and second the control networks.

18. The system of claim 11, further comprising:
a database accessibly by the first and second network controllers, the database being configured to store account information regarding the plurality of users.

19. A system for implementing different network services, the system comprising:
a plurality of control networks selectively connectable to a plurality of service groups, each service group being configured to service a plurality of corresponding set-top boxes (STBs) of end users,
wherein a first control network of the plurality of control networks is configured to initially provide first application software to the plurality of service groups, such that the plurality of STBs serviced by each of the service groups download the first application software for receiving a first service,
wherein a second control network of the plurality of control networks is configured to subsequently provide second application software to a first service group of the plurality of service groups, in place of the first application software, such that the plurality of STBs serviced by the first service group download the second application software for receiving a second service, while the plurality of STBs serviced by each of remaining service groups of the plurality of service groups continue to receive the first service; and
wherein the second control network is configured to subsequently provide third application software to the first service group and a second service group of the plurality of service groups, in place of the second application software and the first application software, respectively, such that the plurality of STBs serviced by the first and second service groups download third application software for receiving a third service, while the plurality of STBs serviced by each of remaining service groups continue to receive the first service.

20. The system of claim 19, wherein the third application software comprises the second application software revised in response to feedback from the end users of the plurality of STBs serviced by the first service group in response to the second application software.

* * * * *